United States Patent [19]
Hasegawa

[11] Patent Number: 5,891,270
[45] Date of Patent: Apr. 6, 1999

[54] HEAT-TREATMENT OF GLASSY METAL ALLOY FOR ARTICLE SURVEILLANCE SYSTEM MARKERS

[76] Inventor: Ryusuke Hasegawa, 29 Hill St., Morristown, N.J. 07960

[21] Appl. No.: 667,152

[22] Filed: Jun. 20, 1996

Related U.S. Application Data

[60] Provisional application No. 60/001,814, Oct. 5, 1995.

[51] Int. Cl.$^6$ .................................................. H01F 1/153
[52] U.S. Cl. ........................................ 148/304; 340/572
[58] Field of Search .................................. 148/304, 403; 340/572

[56] References Cited

U.S. PATENT DOCUMENTS

| | | | |
|---|---|---|---|
| 4,510,489 | 4/1985 | Anderson, III et al. | 340/572 |
| 4,510,490 | 4/1985 | Anderson et al. | 148/304 |
| 4,769,091 | 9/1988 | Yoshizawa et al. | 148/108 |
| 5,225,005 | 7/1993 | Burrage et al. | 148/108 |
| 5,338,373 | 8/1994 | VonHoene et al. | 148/304 |
| 5,395,460 | 3/1995 | Martis | 148/121 |
| 5,539,380 | 7/1996 | Hasegawa et al. | 148/304 |
| 5,650,023 | 7/1997 | Hasegawa et al. | 148/304 |

*Primary Examiner*—John Sheehan
*Attorney, Agent, or Firm*—John A. Squires; Ernest D. Buff

[57] ABSTRACT

A mechanically resonant marker comprises a strip of magnetic glassy metal alloy that has been annealed in a furnace for a predetermined time at a plurality of temperatures. A first of the temperatures is high enough to relieve quenched-in and post fabrication stresses. The second of the temperatures is near the Curie temperature of the strip. Annealing is carried out in the presence of an external magnetic field applied perpendicular to the strip's length and in the plane of the strip. The second of the temperatures is applied sequentially of the first temperature and is operative to induce magnetic anisotropy along the direction of the magnetic field. Annealing is continuous and the annealing time is determined by the velocity of the strip passing through the annealing furnace.

4 Claims, No Drawings

HEAT-TREATMENT OF GLASSY METAL ALLOY FOR ARTICLE SURVEILLANCE SYSTEM MARKERS

BACKGROUND OF THE INVENTION

CROSS REFERENCE TO RELATED APPLICATIONS

This application claims the benefit of U.S. Provisional application No. 60/004,814, filed Oct. 5, 1995.

1. Field of the Invention

This patent relates to a magnetic glassy metal alloy for use in an electronic article surveillance system; and more particularly to a method for heat-treating the alloy to improve the electromagnetic performance thereof.

2. Description of the Prior Art

Article surveillance systems are commercially available in the industrial and retail markets to aid in identification of people or objects. An essential component of such systems is a sensing element or "marker", that is attached to the object to be detected. Other components of the system include a transmitter of an interrogating signal and a receiver of the signal response from the marker. The information contained in the response signal is then processed for actions appropriate to the application, such as denial of access, triggering of an alarm, sorting of articles, and the like.

Several different types of marker-detection systems have been disclosed and are in use. Each marker has to be compatible with a pertinent detection system. Taking advantages of electromagnetic phenomena, three types of marker-detection systems are currently in use: they are based on radio-frequency resonance (hereinafter the "rf marker") utilizing a simple antenna-capacitor-diode circuit, detection of higher harmonics response signal from a magnetically high permeable marker (hereinafter "harmonic marker") and detection of response signal from a magneto-mechanically excited marker (hereinafter "magnetomechanical resonator"). One of the most troublesome problems associated with the first two markers is the low detection reliability thereof. This problem is primarily due to the inherent broadband nature of a simple resonant circuit for an rf marker, and the rapid decay of the response signal generated by a harmonic marker as the distance between the marker and the signal receiver increases. A magneto-mechanical resonator is a semi-active element and, as such, offers a combination of high detection sensitivity, high operating reliability and low operating costs. Examples of such systems are disclosed in U.S. Pat. Nos. 4,510,489 and 4,510,490 (hereinafter the "489" and "490" patents).

The marker in a mechanical resonator based system is a strip, or a plurality of strips, having a known length. Each strip is composed of a magnetically soft ferromagnetic material and is packaged with a magnetically harder ferromagnetic material having a higher coercivity. The harder ferromagnetic material provides a biasing field that establishes peak magneto-mechanical coupling. The soft ferromagnetic marker material is preferably a metallic glassy alloy ribbon, since the efficiency of magneto-mechanical coupling in glassy alloys is very high. The mechanical resonance frequency of the marker material is dictated essentially by the length of the glassy alloy ribbon and the biasing field strength. When an interrogating signal tuned to the resonance frequency is encountered, the marker material responds with a large signal field which is detected by the receiver. This large signal is attributable in part to an enhancement of the marker's magnetic permeability at the resonance frequency. Various marker configurations and systems for the interrogation and detection that utilize the aforementioned principle have been disclosed in the '489 and '490 patents.

In one particularly useful system, the marker material is excited into oscillations by pulses, or bursts, of signal at its resonance frequency generated by the transmitter. When the exciting pulse is over, the marker material undergoes damped oscillations at its resonance frequency. That is to say, the marker material rings down following the termination of the exciting pulse. A receiver listens to the response signal generated during this ring down period. With this arrangement, the surveillance system is relatively immune to interference from various radiated or power line conducted sources, and the potential for false alarms is reduced.

A broad range of alloys have been disclosed in the '489 and '490 patents as being suitable for marker material, for a magneto-mechanical detection system. Other metallic glass alloys bearing high permeability are disclosed in U.S. Pat. No. 4,152,144.

Although many glassy alloys have been disclosed as being suitable as markers for article surveillance systems of the magneto-mechanical variety, commercial systems of this type typically utilize markers composed of as-cast, iron-nickel base glassy alloys. It would be particularly desirable if the size and weight of these markers could be decreased and the signal amplitude thereof increased. However, attempts to accomplish such improvements have been thus far unsuccessful. There remains a need in the art for an improved mechanically resonant marker which is small and light, and resists degradation when subjected to mechanical deformation.

SUMMARY OF THE INVENTION

The present invention provides a small, light-weight magneto-mechanical marker that exhibits high signal amplitude and resists degradation when subjected to mechanical deformation. Such mechanical deformation can occur during manufacture of the marker by processes wherein the marker material is cut or slit.

Generally stated, the marker comprises a strip composed of a magnetic glassy metal alloy. The alloy strip is annealed in a furnace for a predetermined time at a plurality of temperatures. A first of the temperatures is high enough to relieve quenched-in and post-fabrication stresses. The second of the annealing temperatures is near the Curie temperature of the strip. Annealing is carried out in the presence of an external magnetic field applied perpendicular to the ribbon length and in the plane of the ribbon. The second of the temperatures is applied sequentially of the first temperature and induces magnetic anisotropy along the direction of the magnetic field. The annealing process is continuous and the annealing time is determined by the velocity of the ribbon passing through the annealing furnace. Markers composed of glassy alloy ribbon thereby produced exhibit high signal amplitudes at high harmonics of the strip's fundamental mechanical resonance frequency. False alarms are virtually eliminated, and the small, light-weight marker is detected in a highly reliable manner.

DESCRIPTION OF THE PREFERRED EMBODIMENTS

The glassy metal alloy of which the strip of this invention is composed is prepared by cooling a melt of the desired composition at a rate of at least about $10^{5°}$ C./sec, employing quenching techniques well known to the metallic glass art;

see e.g., U.S. Pat. No. 3,856,513. The metallic glasses of which the strip is composed are substantially completely glassy, that is, at least 90% glassy, and consequently possess lower coercivity and are more ductile than less glassy alloys.

A variety of techniques are available for fabricating continuous ribbon, wire, sheet, etc. Typically, a particular composition is selected, powders or granules of the requisite elements in the desired portions are melted and homogenized and the molten alloy is rapidly quenched on a chill surface such as a rapidly rotating cylinder.

The invention will be more fully understood and further advantages will become apparent when reference is made to the following detailed description of the preferred embodiments of the invention and the accompanying examples. The specific techniques, conditions and reported data set forth in the examples to illustrate the principles and practice of the invention are exemplary and should not be construed as limiting the scope of the invention. All alloy compositions described in the examples are nominal compositions.

For purposes of comparison a marker is prepared and tested. Certain values thereof are reported in Table I below. The marker is composed of a slit piece of iron-nickel base glassy metal ribbon having dimensions of about 0.030×1.5× 11 mm. This marker is heat-treated at 300° C. for about 30 minutes in an external magnetic field of about 100 kA/m applied perpendicular to the ribbon length direction and in the ribbon plane. The ribbon piece is mechanically resonated at about 200 kHz by applying an ac field at this frequency and its fourth harmonic is detected by a conventional pick-up coil wound around the ribbon piece. The amplitude is in an arbitrary unit, but is relative to other values reported in this specification. The quantities, $\sigma_f$ and $\sigma_a$ are standard deviations for the 4th harmonic frequency and its amplitude, respectively.

TABLE I

| 4th Harmonic Frequency | $\sigma_f$ | 4th Harmonic Amplitude | $\sigma_a$ |
|---|---|---|---|
| 794 kHz | 5 kHz | 4 | 1.5 |

These properties are not acceptable from a practical standpoint owing to the relatively large value of the standard deviation (i.e. $\sigma_f$ and $\sigma_a$) and the low hamonic amplitude thereof Moreover, the batch process to produce a large quantity of the ribbon pieces is too slow for economical production of the marker.

The disadvantages of the marker described in connection with Table I, are overcome by markers produced, in accordance with the present invention, by heat-treating the ribbon material in a continuous annealing oven in which the ribbon material travels at a predetermined speed in a chamber of controlled temperature with an external magnetic field applied perpendicular to the ribbon direction. The magnitude of the external field which is effective to improve or modify the magneto-mechanical properties of the ribbon depends on the heat-treatment temperature with respect to the Curie temperature or the paramagnetic-to-ferromagnetic transition temperature. However, the magnitude of about 88 kA/m used is sufficient enough to magnetically anneal the ribbon material effectively for the annealing temperatures adopted. As in the case of the Table I marker, the 4th harmonics of the fundamental magnetomechanical resonance frequency are compared for strip that was heat-treated under varying conditions. To demonstrate the effectiveness of the present invention, the results of the 4th harmonic properties of strip annealed under varying conditions are given in Table II below

TABLE II

| Annealing Condition Temperature/Ribbon speed | 4th Harmonic Frequency (kHz) | $\sigma_f$ (kHz) | 4th Harmonic Amplitude (arbitrary unit) | $\sigma_a$ |
|---|---|---|---|---|
| 320° C./0.3 m/min. | 790 | 3 | 4 | 1 |
| 320° C./0.6 m/min. | 795 | 2 | 5 | 1.5 |
| 340° C./0.3 m/min. | 800 | 2 | 5 | 1.5 |
| 340° C./0.6 m/min. | 795 | 2 | 5 | 1.5 |
| 360–340° C./0.3 m/min. | 796 | 3 | 5.5 | 1 |
| 360–340° C./0.6 m/min. | 790 | 3 | 6 | 1 |
| 360–330° C./0.6 m/min. | 797 | 2.5 | 5.5 | 1 |

The two temperatures indicated for the last three examples of Table II are those of the two temperature zones in the continuous annealing oven operated in accordance with the present invention, each zone being about 0.9 m long. It is noted that these annealing conditions result in high amplitudes with small variabilities. For all the cases listed in Table II, variabilities in the resonance frequency are reduced by about ½, and the amplitudes are significantly greater than those obtainable by a batch annealing process of the type described in connection with Table I. By way of comparison, the amplitude of the ribbon in the as-cast and as-slit condition is about 1/10 that of the batch annealing case. An additional advantage resides in the considerable reduction in annealing time, which makes the present process more economical. It is important that the heat-treatment temperature be close to the Curie temperature of the ribbon material. The Curie temperature of the material used to generate the above Tables is about 350° C. This temperature is also effective to anneal out any stress introduced during metal-casting and slitting. In the present case, stress relief and magnetic field annealing can be accomplished either simultaneously or consecutively.

Having thus described the invention in rather full detail, it will be understood that such detail need not be strictly adhered to but that further changes and modifications may suggest themselves to one skilled in the art, all falling within the scope of the invention as defined by the subjoined claims.

What is claimed is:

1. A mechanically resonant marker comprising a slit strip of $Fe_{40}Ni_{38}Mo_4B_{18}$ glassy metal alloy, said slit strip having been annealed in a furnace for a time period at a plurality of temperatures, a first temperatures being 360° C. and a second temperature being 330° C., said annealing being carried out in the presence of an external magnetic field applied perpendicular to the strip's length and in the plane of said slit strip, the second temperature being applied sequentially of the first temperature and being operative to induce magnetic anisotropy along the direction of the magnetic field, said annealing being continuous and said annealing time period mind determined by the velocity of said slit strip passing through the annealing furnace.

2. A mechanically resonant marker as recited by claim 1 wherein said furnace, has a length of 1.8 meters, and said strip travels at a constant velocity ranging from about 0.3 to 10 meters per minute.

3. A mechanically resonant marker as recited by claim 1 wherein said furnace has a length of 1.8 meters, and said strip travels at a constant velocity of about 0.3 meters per minute.

4. A mechanically resonant marker as recited by claim 1 wherein said furnace has a length of about 1.8 meters, and said strip travels at a constant velocity of about 0.6 meters per minute.

* * * * *